(12) United States Patent
Graft et al.

(10) Patent No.: US 12,199,974 B2
(45) Date of Patent: Jan. 14, 2025

(54) SECURED PLATFORM FOR MANAGING TRANSPORTATION LOGISTICS

(71) Applicant: HIGHWAY APP, INC., Dallas, TX (US)

(72) Inventors: Charles Jordan Graft, University Park, TX (US); Brittany Harlan Graft, University Park, TX (US); Brennan Bailey, Dallas, TX (US); Lawson Hopkins, Dallas, TX (US); Clark Taylor, Dallas, TX (US); Charles Dew, Monroe, LA (US); Robert Crady, Frisco, TX (US); John Harlan, Buena Vista, CO (US)

(73) Assignee: HIGHWAY APP, INC., Dallas, TX (US)

( * ) Notice: Subject to any disclaimer, the term of this patent is extended or adjusted under 35 U.S.C. 154(b) by 4 days.

(21) Appl. No.: 17/816,634

(22) Filed: Aug. 1, 2022

(65) Prior Publication Data

US 2024/0039906 A1  Feb. 1, 2024

(51) Int. Cl.
*H04L 9/40* (2022.01)
*G06Q 30/018* (2023.01)

(52) U.S. Cl.
CPC ......... *H04L 63/083* (2013.01); *G06Q 30/018* (2013.01)

(58) Field of Classification Search
CPC .................................................. H04L 63/083
USPC ............................................................ 726/6
See application file for complete search history.

(56) References Cited

U.S. PATENT DOCUMENTS

| | | | | |
|---|---|---|---|---|
| 7,577,622 | B1 * | 8/2009 | Wooten | G06Q 10/08 705/500 |
| 2006/0026017 | A1 * | 2/2006 | Walker | H04L 63/302 701/31.4 |
| 2013/0061302 | A1 * | 3/2013 | Colla | H04W 12/06 726/6 |
| 2014/0263629 | A1 * | 9/2014 | McQuade | B67D 7/0401 235/381 |
| 2017/0039666 | A1 * | 2/2017 | Kuersten | G06Q 30/0251 |
| 2019/0172010 | A1 * | 6/2019 | Miller | G06Q 10/0835 |
| 2020/0342247 | A1 * | 10/2020 | Mains, Jr. | G06V 10/82 |
| 2023/0126369 | A1 * | 4/2023 | Duraisamy | G06Q 50/40 726/6 |

* cited by examiner

*Primary Examiner* — Dant B Shaifer Harriman (57) ABSTRACT

A platform for creating secured connections between motor carriers and intermediaries by requiring physical identity verification of users and authentication of association with regulated entities. The platform may also offer security through distinguishing between authorized motor carrier personnel and third party dispatcher services.

17 Claims, 9 Drawing Sheets

SECURED PLATFORM FOR MANAGING TRANSPORTATION LOGISTICS

BACKGROUND AND SUMMARY

The last two years have highlighted the supply chain's vital role in the US economy. A key component of the US supply chain is the surface transportation industry which includes Truckload (TL), Less-Than-Truckload (LTL), Parcel, and other segments. The TL segment comprises two components: Private fleets and For-Hire fleets. The history of the For-Hire TL market dates back more than 100 years, with the first motor carriers operating in regional hubs to facilitate the transportation of raw materials and agriculture products. A pivotal moment in the history of For-Hire TL came with the Motor Carrier Act of 1980, which resulted in sweeping deregulation of the trucking industry, including the elimination of governmental restrictions on motor carriers' abilities to contract with new customers and operate in new geographies. Over the next four decades, the For-Hire TL market grew rapidly, and the barrier to entry has steadily declined to allow hundreds their thousands of entrepreneurs to start their own trucking companies and provide a solid foundation for the US supply chain.

Post deregulation, another segment of logistics providers arose: freight brokers and third-party logistics providers (3PLs) (collectively, intermediaries). While they existed in a small form before deregulation, their role and market presence exponentially grew as shippers' access to motor carriers opened up from a few regulated operators to the entire TL carrier base and also smaller motor carriers needed support in finding loads for their business. The percentage of For-Hire TL movements covered by an Intermediary increased from 10% in 2000 to over 40% in 2022 as shippers relied on intermediaries more heavily for reliable sourcing of TL capacity and carriers utilized their load availability to cover more of their trucks and lanes.

Currently, the vast majority of transactions in the TL segment covered by Intermediaries segment are transacted offline without a digital interface. As technology and systems have advanced, the demand for the ability to transact digitally by both Intermediaries and TL carriers has increased. One of the key barriers to the ability to transact digitally is a lack of verifiable digital identity of a carrier attached to its regulatory data. The lack of identity has been compounded by the rapid growth of the scale of the Intermediary industry which exposed two key weaknesses: (1) fraudulent behavior by bad actors leveraging the scale and fragmentation of the TL carrier base and (2) a lack of integrated connectivity for industry participants to respond to the rapidly changing nature of the supply chain daily. Today, intermediaries lack a tool that allows them to authenticate a digital session (i.e. web browser) to the physical authority of a registered motor carrier. This creates friction and the opportunity for bad actors to represent themselves as a registered motor carrier. Additionally, the FMCSA does not provide information on the veracity of a motor carrier's claims of power units and trailer counts. There exists little to no integration between the systems of intermediaries and motor carriers in their network, which means rapidly changing market conditions and load availabilities are not being transmitted in real-time between their systems in a structured format. To provide further resilience and efficiency to the US supply chain, intermediaries and motor carriers need a tool that (1) eliminates fraud related to digital identity, (2) allows for digital integration and the consummation of a relationship, and (3) provides frictionless engagement of a motor carrier to an intermediary's web portal and integration to its systems.

Intermediaries and TL carriers are both regulated entities that require that they establish their operating authority with the FMCSA prior to operating. The FMCSA maintains the authority status of all interstate Intermediaries and TL carriers in the US. However, an industry of unregulated dispatcher services ("Dispatcher Services") has gained market share in the US. These Dispatcher Services contract with motor carriers to provide them load sourcing services. The unregulated nature and obscurity of the commercial relationship between Dispatcher Services and TL carriers create significant execution and fraud risk in the industry. Today, almost 20% of all attempts to onboard with Intermediaries in the US are executed by Dispatcher Services, and Intermediaries have no visibility or tools to identify when information is being completed by a Dispatcher Service, whether the Dispatcher Service is authorized to work the designated TL carrier, or legal and contact information for the Dispatcher Service apart from the motor carrier. The impact on Intermediaries is increased legal and execution risk if they allow a Dispatcher Service to sign contracts, provide payment details, and dispatch loads without proper authorization from the designated motor carrier.

This disclosure presents a platform for creating a secure, reliable, and efficient connection between motor carriers and intermediaries. The platform is designed to facilitate verification of the previously-described requirements by connecting the digital identity of motor carriers to their physical registered identities with the U.S. Department of Transportation.

Exemplary elements of the platform include using SMS-based text messages to authenticate users instead of e-mail/password logins. This authentication and verification of the motor carrier allow for a more efficient connection with intermediaries. Likewise, motor carriers can engage with intermediaries with less friction. The platform also reduces overhead by allowing for operations with fewer people and more integration with carrier networks.

DETAILED DESCRIPTION

This description, with references to the figures, presents non-limiting examples of embodiments of the present disclosure.

Embodiments of the present disclosure relate generally to a platform for improving identity verification and connectivity between motor carriers and intermediaries as well as integration of the TMSs thereof. Such a platform may comprise a data storage element, an interface element, and a data processing element.

In certain embodiments, the data storage element includes some form of reversible memory configured to allow for retrieval, search, or storage of data. Said data may include at least a set of carrier data. The set of carrier data may include identifying information such as a primary key corresponding to a motor carrier. This identifying information may be, for example, a department of transportation (DOT) number, a motor carrier (MC) number, a motor carrier owned or controlled by a citizen or domiciliary Mexico (MX) number, or a Standard Carrier Alpha Code (SCAC).

Within these embodiments, the interface element is configured for communication with the data storage element via the data processing element. The data processing element may be one or more software structures programmed for algorithmic, logical, or other data processing or transmission. The interface element may be accessible on a conventional computing device such as a personal computer or mobile telephone, or alternatively via a web browser or standalone application. As will be described further below, the interface element is configured to accept user input. The data processing element may be configured to relay exchange data between the interface element and the data storage element. Exchange data may include queries of carrier data stored in the data storage element.

Synchronizing Existing Data

Figure 1:
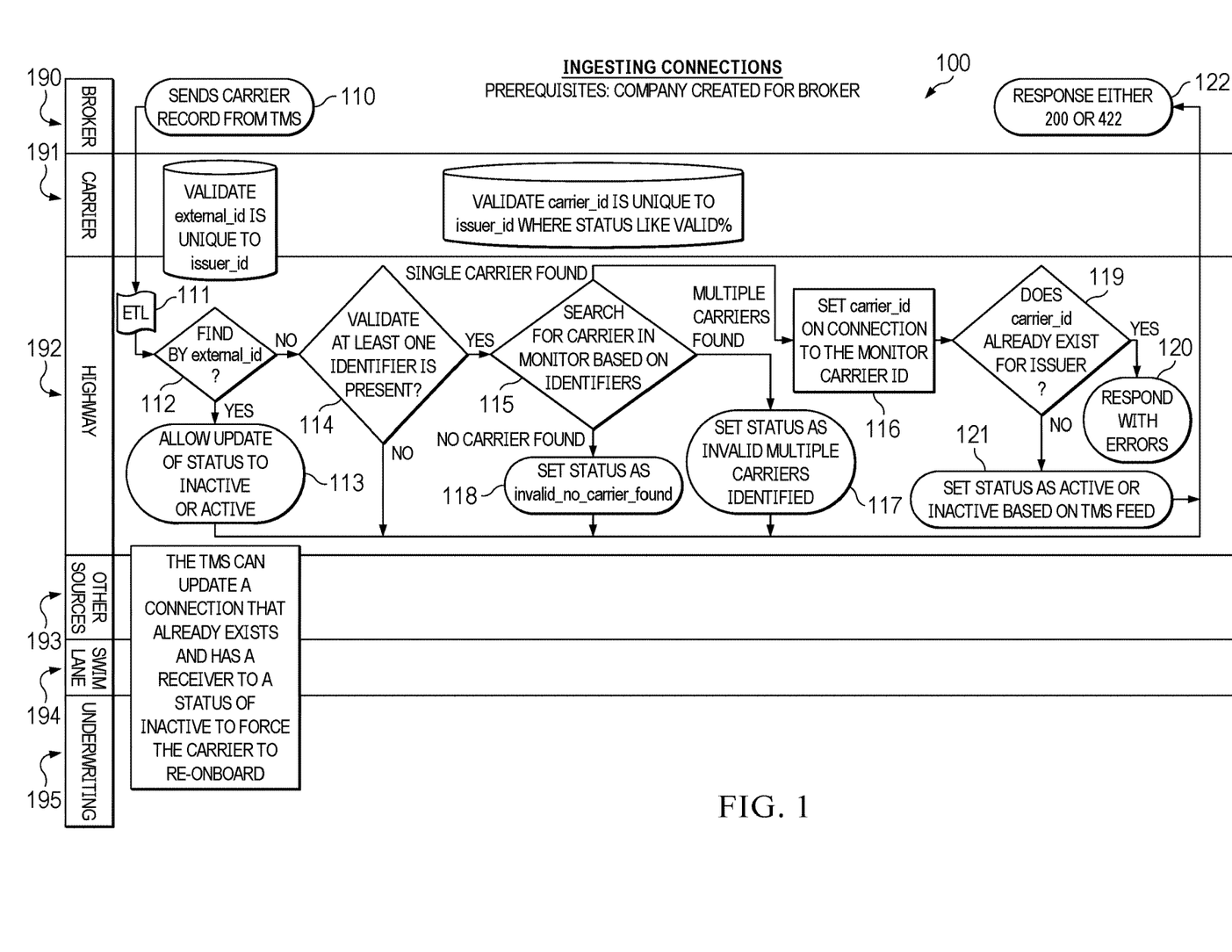
FIG. 1 depicts a flow chart illustrating importing motor carrier data into a platform from an intermediary's transportation management software (TMS) according to embodiments of the present disclosure.

As depicted in FIG. 1, to facilitate the improvement of motor carrier and intermediary connectivity, a platform in accordance with embodiments of the present disclosure may synchronize an intermediary's existing motor carriers. The platform may be configured to communicate with the intermediary's TMS—for example, through an application programming interface (API). Through the interface element, a user intermediary may cause one or more sets of carrier data associated with the intermediary to be communicated to and stored in the data storage element. One or more sets of carrier data may define an intermediary's carrier list within the data storage element. Each set may be a digital representation of a motor carrier currently in the intermediary's motor carriers contained in the intermediary's TMS. Each set may include identifying information as previously described. Additionally, in the set of associated carrier data, the system provides a primary key linked to that specific carrier which translates to one or more federal or state identifiers for that carrier.

Once the set of carrier data is received by the platform, the set of carrier data may be validated. The data processing element may be configured to parse the set of carrier data to locate an instance of relevant identifying information which allows the platform to associate the digital representation of the carrier with the carrier's physical identity. If there are no instances or multiple instances of identifying information found, the platform may return an error message to the intermediary. Upon verifying that there is only a single instance of identifying information and linking the set of carrier data to a physical carrier identity, the data processing element may be further configured to verify that the same carrier is not already present in the intermediary's carrier list before storing the record in the data storage element. In the event that an intermediary's set of carrier data is validated, the platform may then store the carrier data as a unique motor carrier record within the data storage element. Further, the platform may be configured to communicate with the intermediary TMS to receive the status of this subject motor carrier connection which may indicate if the carrier has been onboarded, needs to be onboarded, or that the carrier should not be dispatched.

Creating Secured Connections

Figure 2:
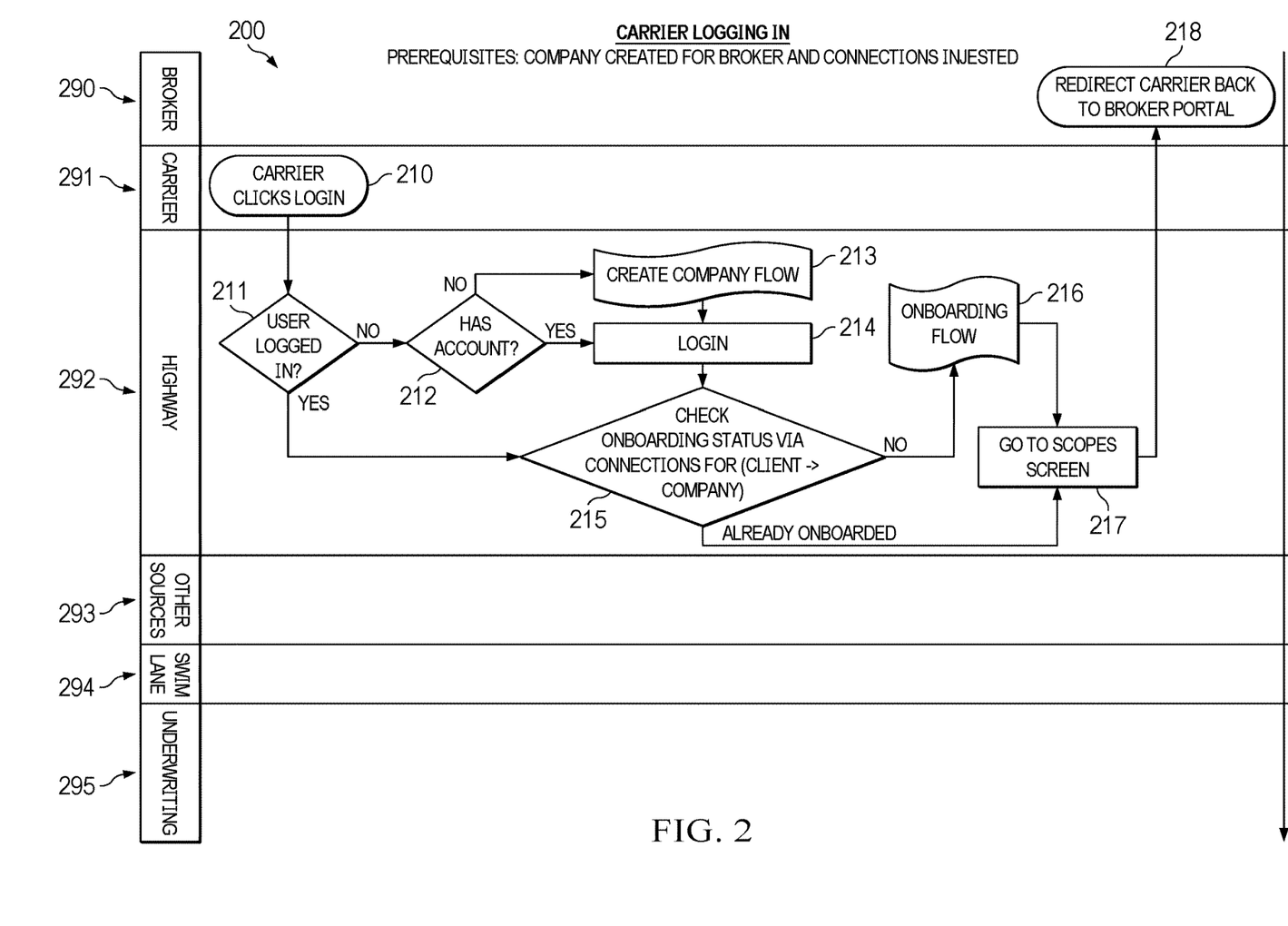
FIG. 2 illustrates a carrier login.
Figure 3A:
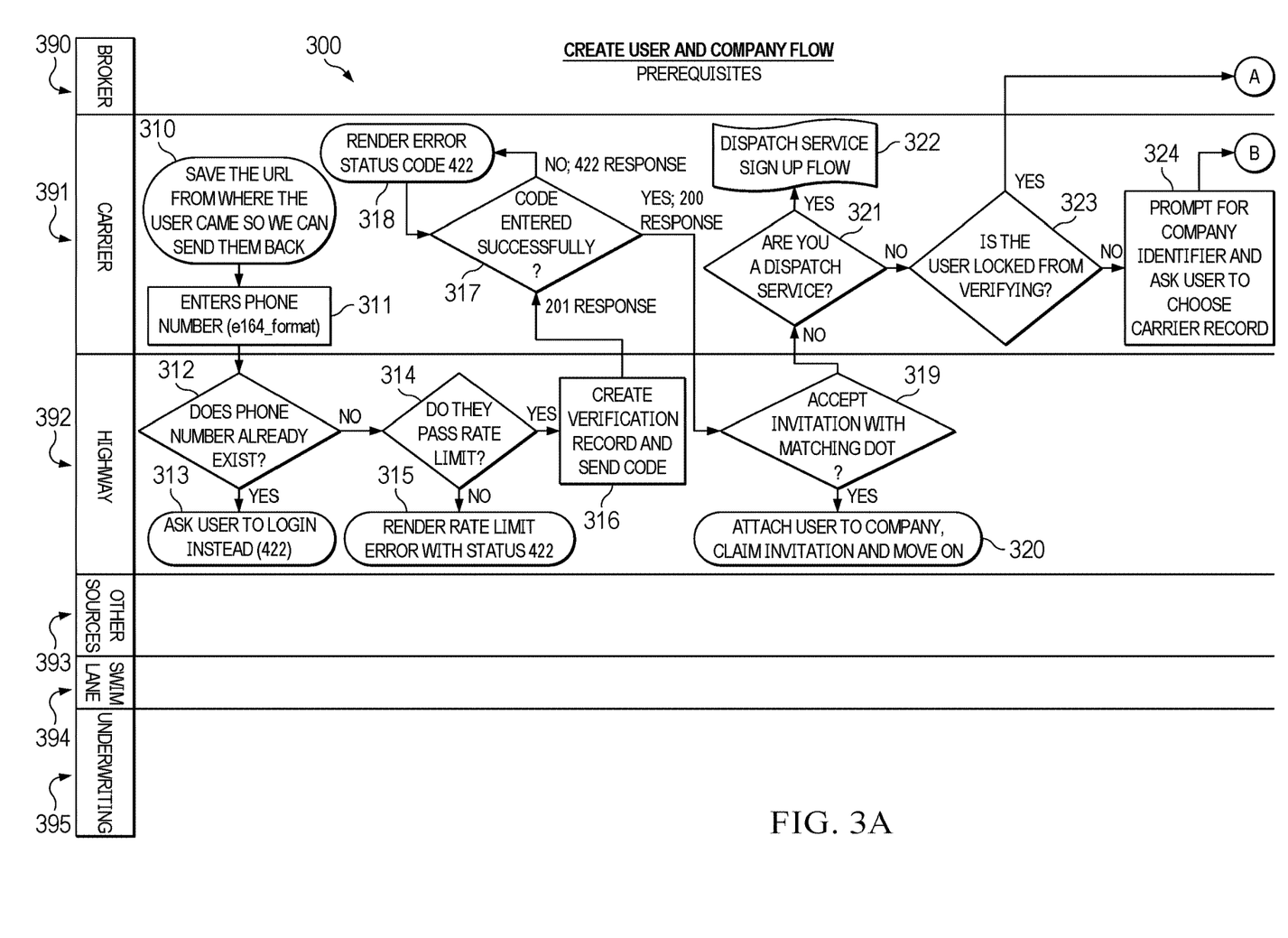
FIGS. 3A-3C depict a flow chart illustrating the creation of user records on a platform according to embodiments of the present disclosure.
Figure 3B:
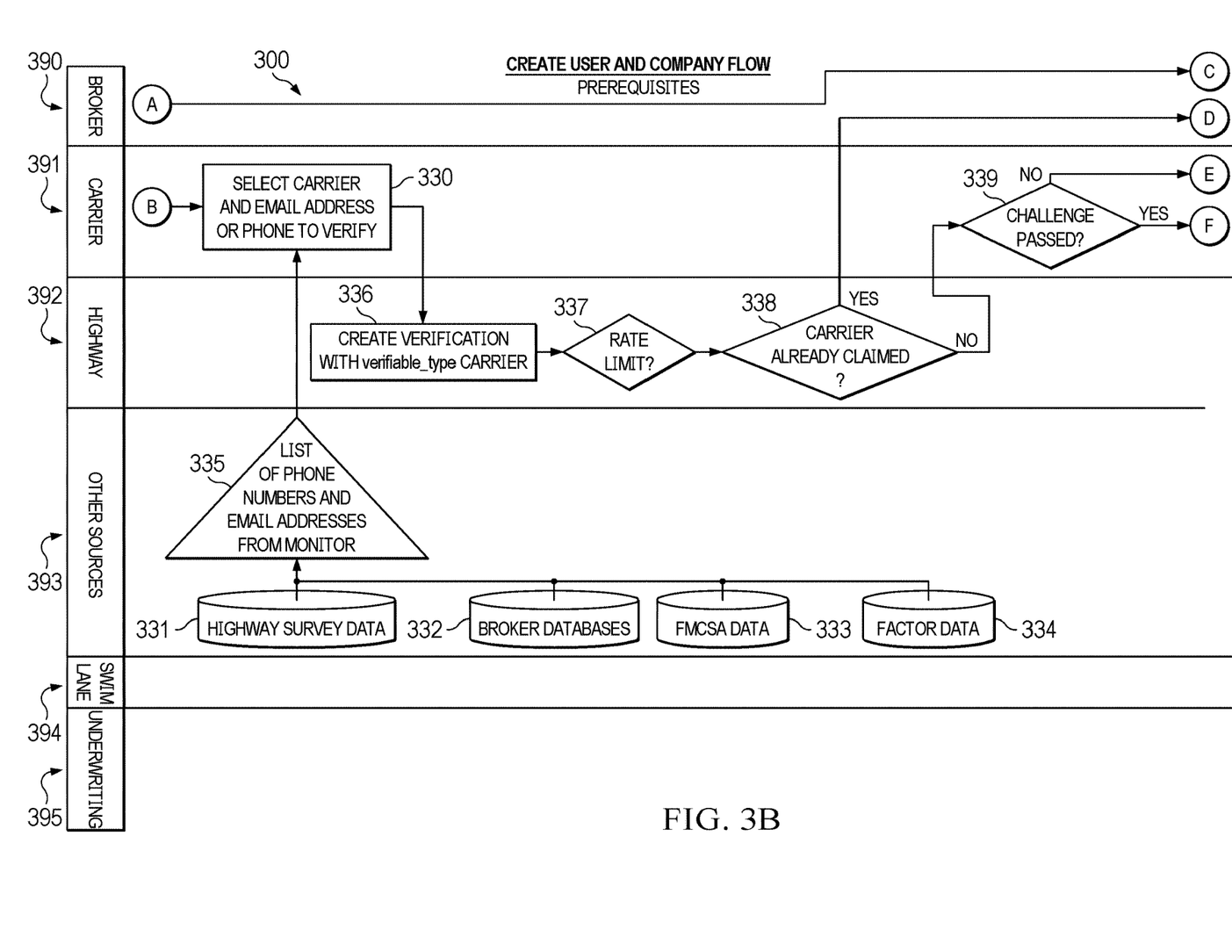
Figure 3C:
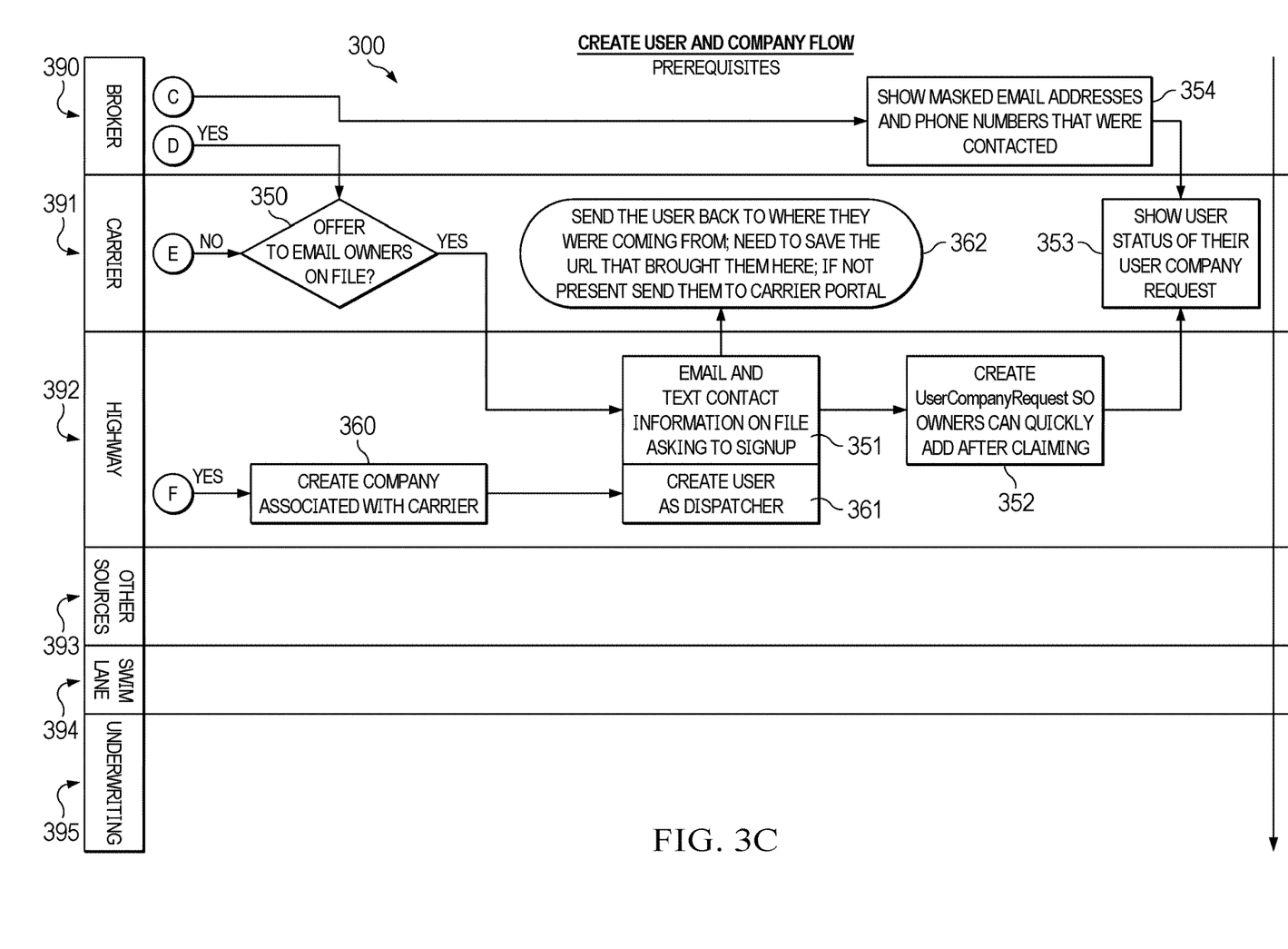

In addition to communicating with an intermediary's TMS, the platform may also be configured to allow motor carriers to generate secure connections with intermediaries, as depicted in FIG. 2. A motor carrier user may interact with the platform via the interface element as embodied in a website. In some embodiments, a motor carrier user may be directed to the interface element via an external link on, for example, an intermediary's website. In such cases, when the motor carrier user is directed to the platform via an external link, the platform may be configured to save the originating URL for later redirection. In these cases, the motor carrier user may be prompted to enter some form of identifying information—such as a DOT or motor carrier number. This information may be passed along to the platform when the external link is clicked. Alternatively, the motor carrier user may be prompted to enter the identifying information when they arrive at the interface element. The platform will verify that the identifying information is valid. This verification may occur by evaluating the entered identifying information against authentication records in the data storage element that originates from external data sources (such as FMCSA or DOT data).

Such data sources are periodically updated—daily in the case of the FMCSA and monthly for DOT data. This updated data may be entered into the data storage element by a system administrator or other personnel as the updated data is received. Once entered into the data storage element, the evaluation may be performed by querying or otherwise retrieving the stored authentication records for comparison with the entered identifying information.

After verification, the platform may then prompt the user to provide an external identity authenticator—such as a phone number or e-mail address. Once entered, the platform may send an authentication code or link to the provided phone number or address. In the case of an authentication code, the motor carrier user may be prompted to enter the code via the interface element to proceed with registration on the platform. If the correct code is entered, a platform account record is created for the motor carrier user. The platform account record includes the phone number (or e-mail address) as well as the identifying information. The platform may be configured to allow an external identity authenticator (phone number or e-mail address) to be associated with only a single platform account record.

Figure 5A:
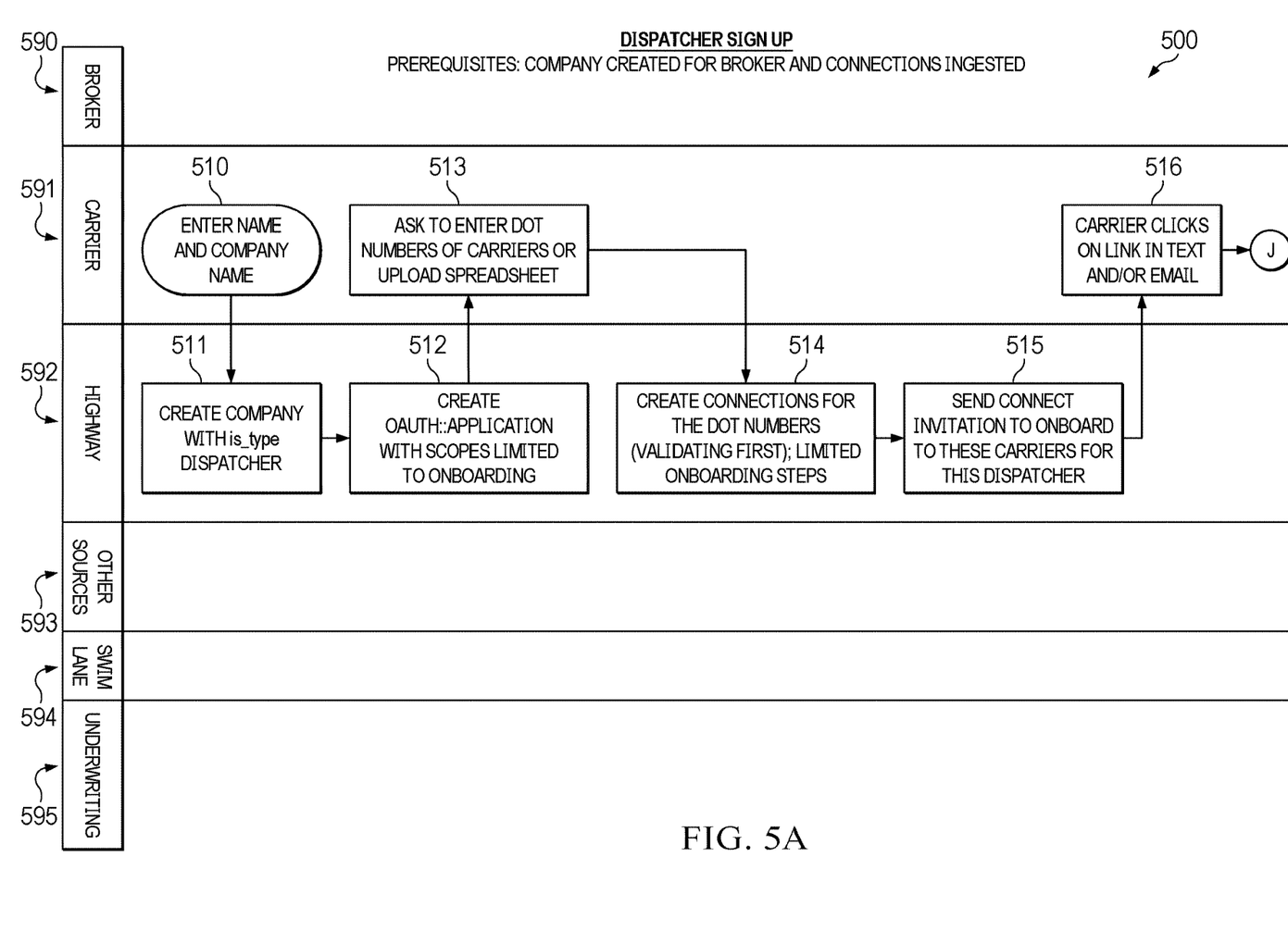
FIGS. 5A-5B depict a flow chart illustrating the creation of dispatcher-service user records on a platform according to embodiments of the present disclosure.
Figure 5B:
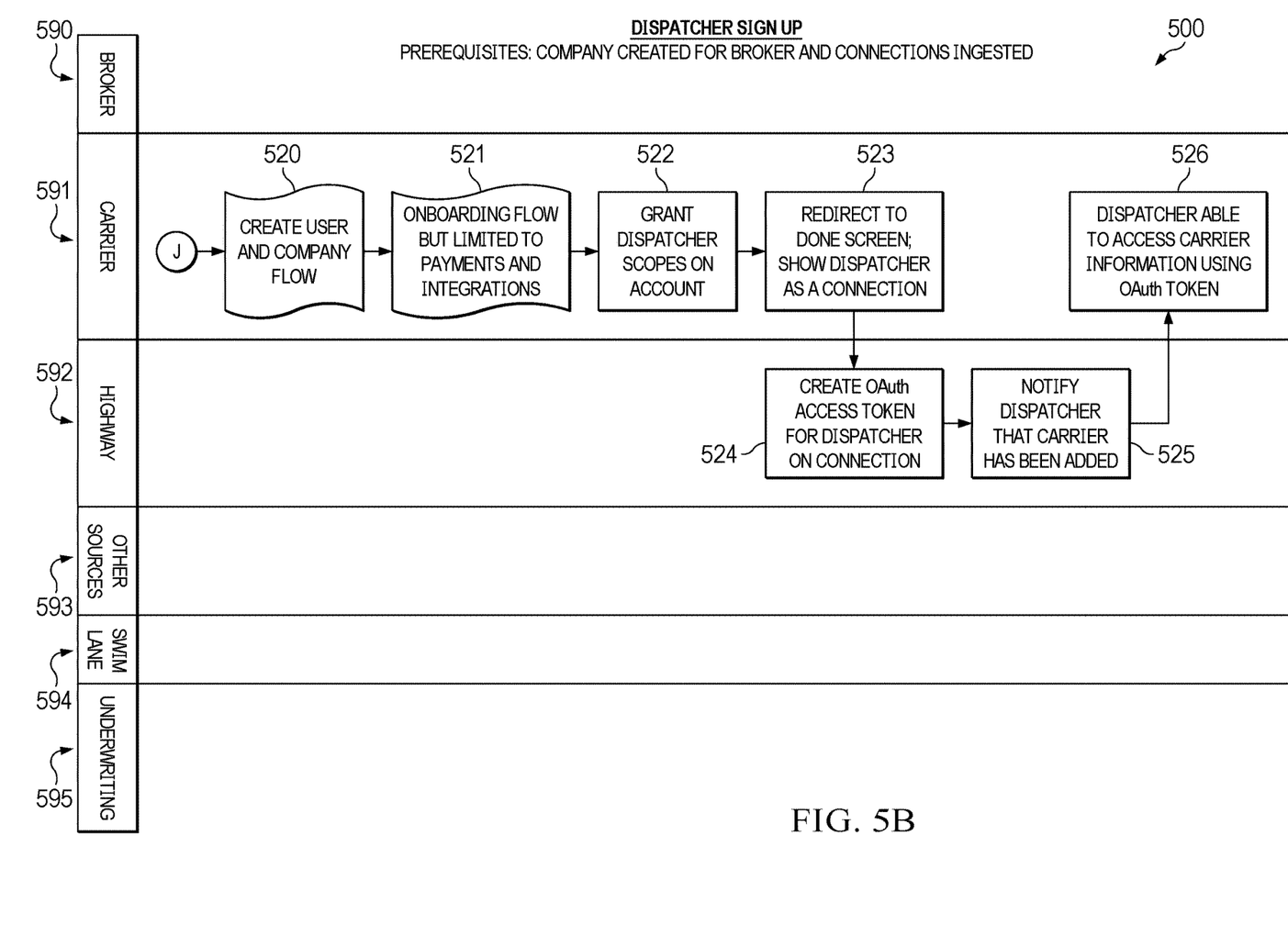

At this stage, the motor carrier user may be asked (for example, via a prompt on the interface element) to confirm their status as a motor carrier or be asked if they are a dispatcher service as shown in FIGS. 5A-5B. If the motor carrier user indicates that they are a dispatcher service, the platform may follow special procedures to verify that the dispatcher service is authorized to operate in collaboration with the designated motor carrier as identified when first accessing the platform. In some embodiments, when the motor carrier user indicates that they are a dispatcher service, the platform may send a confirmation request to the identified motor carrier. The confirmation request may be a link sent to a phone number or e-mail associated with the motor carrier. The platform may be configured to create a dispatcher service company record and to allow further dispatcher service onboarding consistent with the steps to-be described below once the link is accessed or the confirmation request is otherwise fulfilled. If the confirmation request is not fulfilled, no record will be created, and the motor carrier user will not be allowed to onboard.

If the motor carrier user did not indicate that they are a dispatcher service or if the particular embodiment does not require confirmation of the motor carrier user's status, the motor carrier user may then be asked if they are an authorized representative of the motor carrier whose identifying information they have provided. If the motor carrier user indicated that they were an authorized representative of the motor carrier, the platform will present the motor carrier users with a set of motor carrier identity authenticators. This set of motor carrier identity authenticators may be part of the authentication records stored in the data storage element.

A motor carrier authenticator may be a phone number or e-mail address officially registered to the identified motor carrier's physical identity—for example, a phone number or address that is on file with the Department of Transportation, a state DMV, or other sources from which the platform gathers information (such as the external data sources described previously).

The motor carrier user may then select one of the presented motor carrier identity authenticators. An authentication code or link may then be sent to the selected motor carrier identity authenticators. If a code is sent, the motor carrier user may be prompted to enter that code via the interface element. If the code is entered correctly, a company record is created within the data storage element that represents that motor carrier and is associated with the unique external identity authenticator. The company record may comprise data including the identifying information, motor carrier identity authenticators, and a set of authorized persons.

Once an external identity authenticator and a company record are associated, they cannot become unassociated unless a platform administrator authorizes it. For security purposes, a log should be kept of any linking/unlinking of external identity authenticators and company records. Additionally, in some embodiments, once a company record has been associated with an external identity authenticator, it may not be associated with any other. In these embodiments, the first user platform account record holder that is associated with a company record may be allowed to add users to the set of authorized persons within the company record. Users may be added directly by the user platform account record holder or by approval by the user platform account record holder of a request made by a user to join the company's set of authorized persons.

Onboarding

Figure 4A:
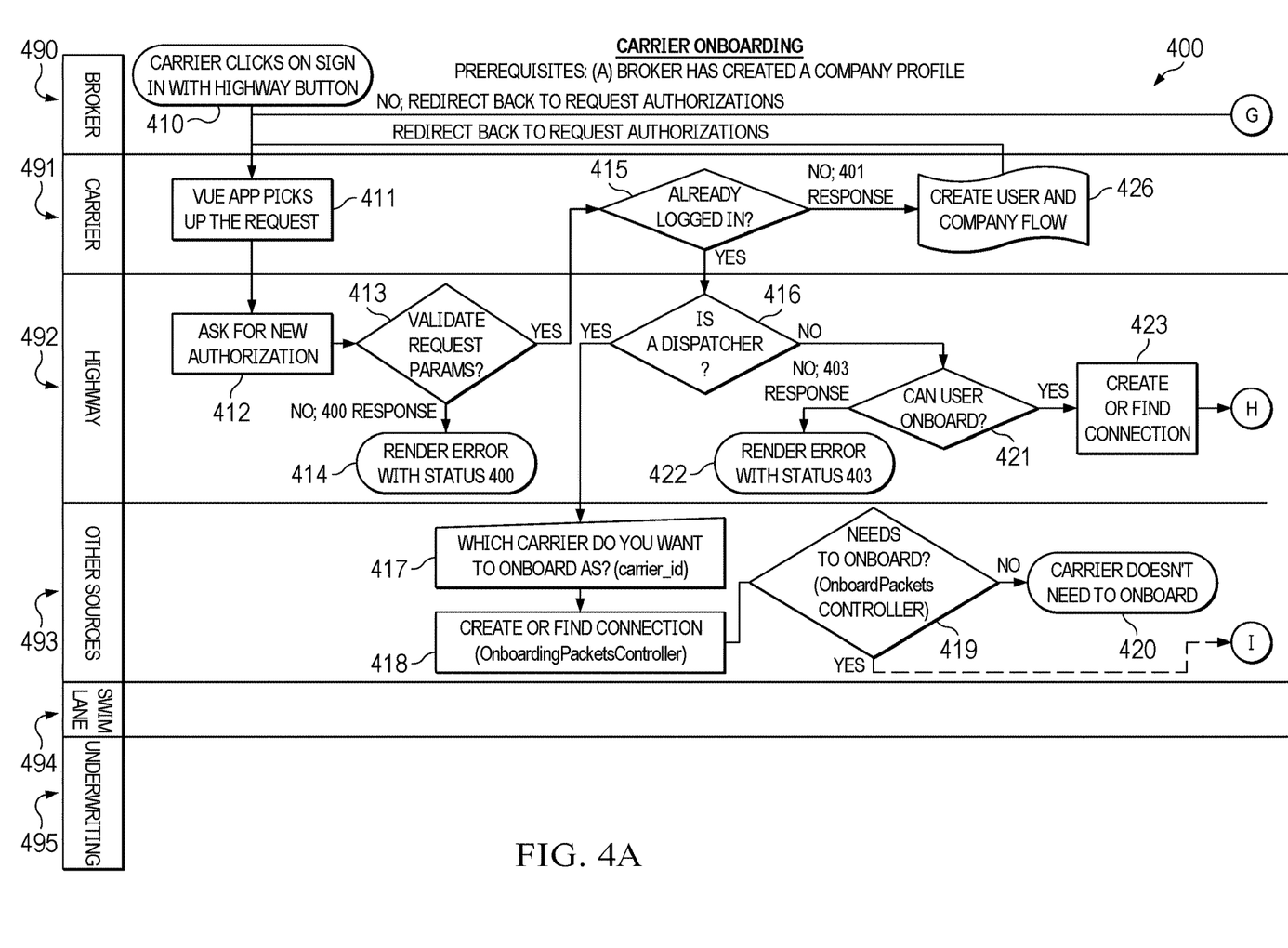
FIGS. 4A-4B depict a flow chart illustrating user onboarding on a platform according to embodiments of the present disclosure.
Figure 4B:
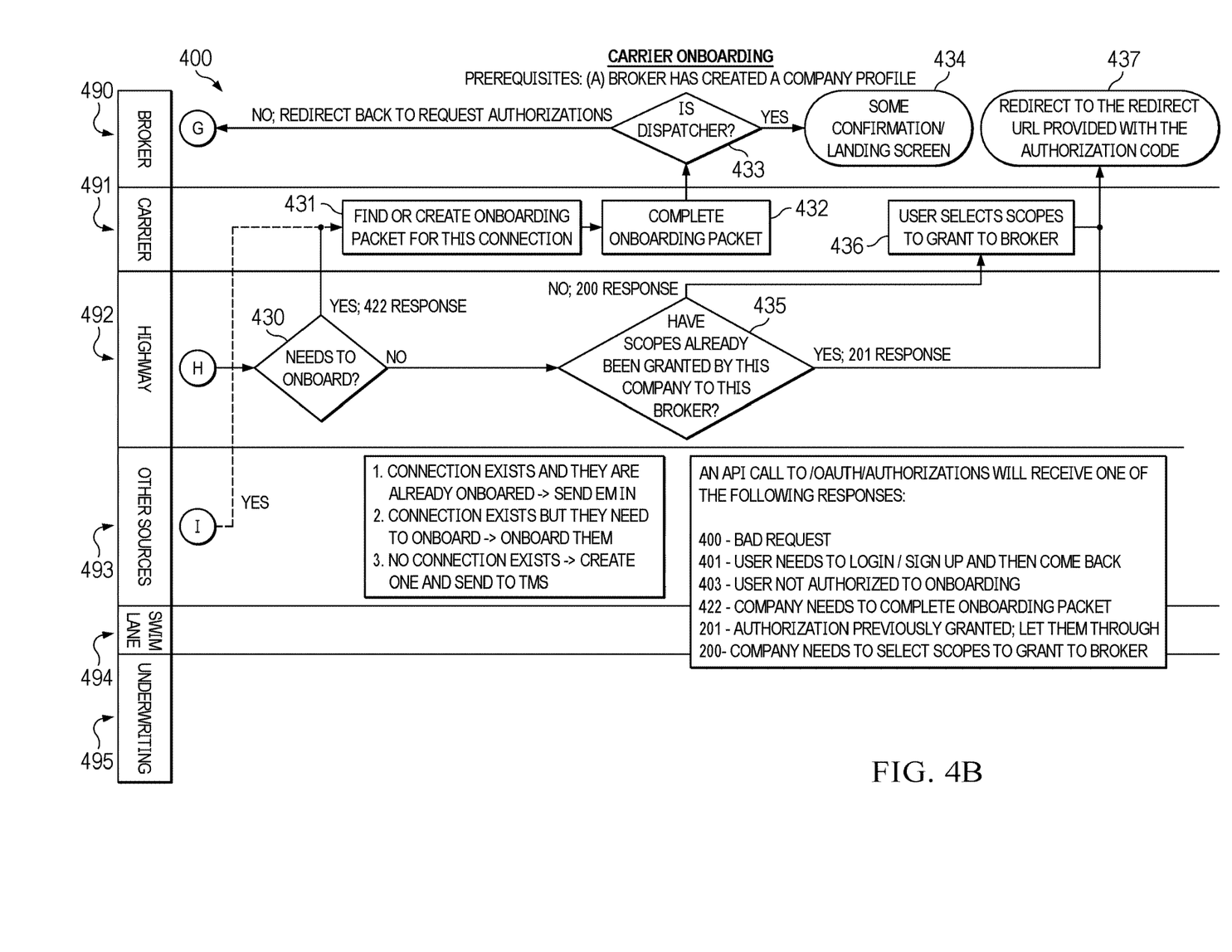

The platform may be further configured to allow the onboarding of a motor carrier to an intermediary as seen in FIGS. 4A-4B. As discussed above, a motor carrier user may access the platform via an external link on an intermediary website. For purposes of this disclosure, an exemplary platform may be referred to as "Highway." When the motor carrier user visits the intermediary website, the external link may be shown as the text or a button displayed: "Login with Highway." When clicked, this link will redirect the motor carrier user using the OAuth 2.0 protocol. The redirection to the platform portal uses a combination of query parameters that identify the intermediary with whom the motor carrier user is attempting to connect. The platform then validates the structure of the query parameters against a pre-registered intermediary profile stored in the data storage element of the platform.

Upon validation, the platform checks the motor carrier user's current login status. If the user is not logged in, the user is prompted to enter their login credentials or to create a platform account record as described previously. Once the account record is created, or the user is otherwise logged in, the platform then evaluates if the user can onboard and if the user has authorization under the motor carrier's digital profile to onboard the motor carrier to an intermediary. User authorization may be evaluated by verifying the user's presence in the respective motor carrier's company record's set of authorized persons.

If the user can onboard the motor carrier, the platform will check to see if a connection already exists between the motor carrier and the intermediary. A connection exists if the motor carrier is present in the intermediary's carrier list within the data storage element. If the connection does not exist, the platform may create a new set of carrier data to include in the intermediary's carrier list. The new set of carrier data will not include an external foreign key in order to notify the intermediary's TMS that the motor carrier is new to its system. If the connection does exist, the platform will verify that the motor carrier for whom the user is trying to connect is the same as that within the intermediary's carrier list by comparing the identifying information within the set of carrier data within the intermediary's carrier list to that associated with the user's platform account record.

If the motor carrier identity in the user's platform account record and in the intermediary's carrier list is the same, the platform may next determine if the motor carrier needs to onboard by checking the motor carrier status as provided by the intermediary's TMS. If the motor carrier needs to onboard, the platform will prompt the user to complete an onboarding process.

The onboarding process may involve the user creating a core profile, including dispatcher and emergency contact information, lane preferences of the carrier, equipment portfolio of the carrier, and insurance information. After the core profile is completed, the user may be asked to provide intermediary-specific information. The intermediary-specific information may include payment terms and a signature to an intermediary-motor carrier agreement or contract. Additionally, the platform may prompt the user to answer customized questions provided by the intermediary which are not otherwise included in the core profile.

Once the onboarding process is completed, the platform will then evaluate the user's core profile according to an intermediary-defined set of onboarding rules. The intermediary-defined set of onboarding rules may take the form of conditions such as minimum insurance coverage, length of the carrier's authority, and safety record requirements. These requirements may be associated with the intermediary's profile. If the motor carrier user's core profile or intermediary-specific information does not satisfy the conditions required by the intermediary-defined set of onboarding rules, the evaluation fails. In the event of a failure, the platform may notify the intermediary of the attempted onboarding, and the intermediary may elect to override the failure and permit onboarding through the platform portal.

Once the user selects which scope to authorize the intermediary to integrate with, they may be redirected to the original intermediary's URL per OAuth 2.0 protocol. The intermediary's systems then continue the OAuth 2.0 protocol by receiving the code provided in the redirect URL. This code is sent along with pre-signed headers using the client ID, which was provided to the intermediary ahead of time during setup, to receive an OAuth access token. This OAuth access token follows the OAuth 2.0 protocol. It may include a signature verifying the issuing identity, an expiration time, an access token itself, and a refresh token. The intermediary's systems may then use this access token to verify the digital identity of the motor carrier and associate it with a physical motor carrier profile both on the platform and within the intermediary's TMS.

As described above, if the physical motor carrier profile does not already exist in the intermediary's system, the platform will create a set of carrier data associated with it and update this data with a callback from the TMS which details the foreign key, originally left blank, for the new connection.

Persons of ordinary skill in the art would recognize that the connection and integration of systems to the platform may vary depending on the participating carriers and intermediaries such that the scope of this disclosure is not limited to only those particular configurations of systems described in the various embodiments.

The invention claimed is:

1. A system for creating secured connections between motor carriers and intermediaries comprising:
    an interface element;
    a memory configured to replaceably store one or more authentication records for one or more motor carriers, said memory being further configured to replaceably store one or more sets of motor carrier data;
    a processor configured to:
        synchronize the one or more authentication records associated with the one or more motor carriers currently stored within the memory;
        create a secured connection between a motor carrier and an intermediary using identifying information and an external identity authenticator and an authentication link;
        determine whether the motor carrier is currently onboarding with the intermediary;
        onboard the motor carrier with the intermediary responsive to a determination that the motor carrier is not currently on boarding with the intermediary; and
        access motor carrier data for the motor carrier responsive to a determination that the motor carrier is currently on boarding with the intermediary.

2. The system of claim 1 wherein each record of said one or more authentication records includes a motor carrier identification number.

3. The system of claim 2 wherein said processor is further configured to ascertain if a user is acting on behalf of a dispatcher service or the motor carrier, the processor is further configured to require a digital confirmation from said motor carrier to verify a commercial relationship between said user and said motor carrier if said processor determines that said user is acting on behalf of said dispatcher service.

4. The system of claim 2 wherein said processor is further configured to allow one or more motor carrier authenticators to be presented to a user via said interface element if an identifier is found within said one or more authentication records.

5. The system of claim 4 wherein said one or more motor carrier authenticators includes at least one of an e-mail address or telephone number.

6. The system of claim 5 wherein said one or more authentication records includes said one or more motor carrier authenticators.

7. The system of claim 6 wherein said interface element is configured to allow said user to select one motor carrier authenticator of said one or more motor carrier authenticators.

8. The system of claim 7 wherein said processor is further configured to communicate an authentication code to said one motor carrier authenticator, wherein said interface element is further configured to allow said user to input said authentication code.

9. The system of claim 8 wherein said processor is further configured to create a motor carrier record in said memory if said user correctly inputs said authentication code via said interface element.

10. The system of claim 9 wherein said one or more authentication records originates from data provided by at least one official regulatory body.

11. The system of claim 10 wherein said at least one official regulatory body is a Federal Motor Carrier Safety Administration.

12. The system of claim 11 wherein said at least one official regulatory body is a Department of Transportation.

13. The system of claim 1, wherein the processor configured to synchronize the one or more authentication records is further configured to:
    locate identifying information to associate a digital representation of the motor carrier with a physical identity of the motor carrier;
    link a set of motor carrier data of the motor carrier with the physical identity of the motor carrier;
    verify that the motor carrier data of the motor carrier is not currently present in validated data of the intermediary; and
    store the motor carrier data as a unique authentication record within the memory if the motor carrier data of the motor carrier is not currently present in the validated data of the intermediary.

14. The system of claim 1, wherein the processor configured to create the secured connection is further configured to:
    receive identifying information for the motor carrier from the motor carrier;
    verify a validity of verifying information for the motor carrier;
    prompt the motor carrier to provide an external identity authenticator;
    receive the external identity authenticator from the motor carrier;
    transmit an authentication code to a contact associated with the external identity authenticator;
    receive the authentication code back from the motor carrier; and
    create a platform account record for the motor carrier responsive to receipt of the authentication code from the motor carrier.

15. The system of claim 14, wherein the processor configured to create the secured connection is further configured to:
    determine whether the motor carrier is a dispatch service; and
    determine whether a user providing information for the motor carrier is an authorized user responsive to a determination that the motor carrier is not the dispatch service.

16. The system of claim 14, wherein the processor is further configured to establish a record for the motor carrier as a dispatch service responsive to a determination that the motor carrier is the dispatch service.

17. The system of claim 1, wherein the processor configured to onboard the motor carrier is further configured to populate a record for the motor carrier with a set of motor carrier data.

\* \* \* \* \*